(12) United States Patent
Conner

(10) Patent No.: US 8,739,453 B1
(45) Date of Patent: Jun. 3, 2014

(54) MAGNETIC FIREARM SUPPORT

(71) Applicant: Barry Wayne Conner, Grants Pass, OR (US)

(72) Inventor: Barry Wayne Conner, Grants Pass, OR (US)

( * ) Notice: Subject to any disclaimer, the term of this patent is extended or adjusted under 35 U.S.C. 154(b) by 0 days.

(21) Appl. No.: 13/647,358

(22) Filed: Oct. 8, 2012

(51) Int. Cl.
*F41A 23/18* (2006.01)
*A47B 81/00* (2006.01)
*B60R 11/00* (2006.01)

(52) U.S. Cl.
USPC .............................. 42/99; 42/94; 248/206.5

(58) Field of Classification Search
USPC ................... 248/206.5, 309.4, 467, 537, 683; 89/37.04; 42/99
See application file for complete search history.

(56) References Cited

U.S. PATENT DOCUMENTS

| | | | |
|---|---|---|---|
| 2,644,212 A * | 7/1953 | Markowitz | 24/11 R |
| 3,266,633 A * | 8/1966 | Graebner | 211/70.8 |
| 3,566,526 A | 3/1971 | La Violette | |
| 3,746,177 A | 7/1973 | Vilotti | |
| 4,907,769 A * | 3/1990 | Hunley et al. | 248/185.1 |
| 4,936,038 A | 6/1990 | Johnson et al. | |
| 4,985,817 A * | 1/1991 | Yale | 362/396 |
| 5,078,279 A * | 1/1992 | Hancock et al. | 211/64 |
| D346,950 S | 5/1994 | Dunn et al. | |
| 5,344,032 A * | 9/1994 | Ramsdell | 211/64 |
| 5,360,190 A * | 11/1994 | Walker et al. | 248/201 |
| 5,411,231 A * | 5/1995 | Buck | 248/206.5 |
| D359,441 S * | 6/1995 | Miller | D8/367 |
| D368,018 S * | 3/1996 | McDowell et al. | D8/367 |
| 5,596,830 A * | 1/1997 | Morgan | 42/94 |
| 5,695,165 A * | 12/1997 | Moriarty | 248/316.8 |
| 5,915,572 A * | 6/1999 | Hancock | 211/64 |
| 5,937,559 A | 8/1999 | Jennen | |
| 5,979,675 A * | 11/1999 | Moriarty | 211/60.1 |
| D449,977 S | 11/2001 | Dembowiak et al. | |
| 6,352,229 B1 * | 3/2002 | Adams | 248/316.7 |
| 6,425,560 B1 * | 7/2002 | Dembowiak et al. | 248/206.5 |
| 6,477,749 B1 * | 11/2002 | Reiter | 24/303 |
| 6,491,271 B1 * | 12/2002 | Adams | 248/206.5 |
| 6,637,707 B1 * | 10/2003 | Gates et al. | 248/224.7 |
| 6,793,109 B2 * | 9/2004 | Gates et al. | 224/401 |
| 6,793,184 B2 * | 9/2004 | Dougal et al. | 248/206.5 |
| 7,377,474 B2 * | 5/2008 | Curtis | 248/206.5 |
| 7,618,013 B2 * | 11/2009 | Elmer et al. | 248/309.4 |
| 7,699,277 B2 * | 4/2010 | Bagnall | 248/206.5 |
| 7,963,406 B2 | 6/2011 | Kinsella | |
| 8,403,278 B1 * | 3/2013 | Kasbohm | 248/206.5 |
| 2004/0099776 A1 * | 5/2004 | Dougal et al. | 248/206.5 |
| 2005/0279725 A1 * | 12/2005 | Sheldon et al. | 211/175 |
| 2009/0039231 A1 * | 2/2009 | McLaughlin | 248/535 |

* cited by examiner

*Primary Examiner* — Bret Hayes
*Assistant Examiner* — Derrick Morgan
(74) *Attorney, Agent, or Firm* — Jerry Haynes Law

(57) ABSTRACT

A magnetic firearm support includes a base, at least one magnet in the base and a firearm cradle having a firearm space carried by the base.

10 Claims, 2 Drawing Sheets

MAGNETIC FIREARM SUPPORT

FIELD OF THE INVENTION

Illustrative embodiments of the disclosure generally relate to supports for firearms. More particularly, illustrative embodiments of the disclosure relate to a magnetic firearm support which is suitable for supporting a firearm on any ferrous metal surface (steel) such as the interior door or wall of a firearm safe.

BACKGROUND OF THE INVENTION

Firearms including pistols and long firearms such as rifles are commonly stored in a vertical position in a firearm safe. One of the drawbacks of storing long firearms in conventional firearm safes is that the firearms may have a tendency to inadvertently fall over if not appropriately secured. Moreover, removal of the firearm from the safe may be cumbersome since the stock of the firearm may be inserted in a slot in the lower portion of the safe. Removal of a firearm from the rear portion of the safe may require that firearms in the front portion of the safe be removed to clear a path for removal of the firearm. Placing a firearm in the safe for storage may be equally cumbersome.

Therefore, a magnetic firearm support which can be magnetically attached to a steel surface in a firearm safe or elsewhere for ease in storage and access or retrieval of a firearm may be desirable in some applications.

SUMMARY OF THE INVENTION

Illustrative embodiments of the disclosure are generally directed to a magnetic firearm support which can be magnetically attached to a steel surface in a firearm safe or elsewhere for ease in storage and access or retrieval of a firearm. The magnetic firearm support may include a base, at least one magnet in the base and a firearm cradle having a firearm space carried by the base.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description. Relative terms such as "bottom" and "top" herein are used with reference to relative positions of various elements with respect to each other in exemplary application of the magnetic firearm support and are not intended to be used in a limiting sense.

Figure 1:
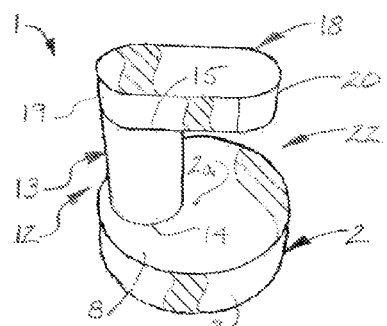
FIG. 1 is a perspective view of an illustrative embodiment of the magnetic firearm support.
Figure 2:
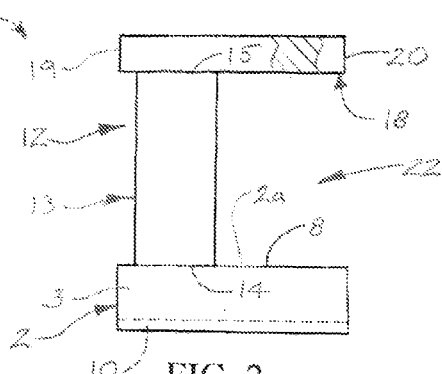
FIG. 2 is a side view of an illustrative embodiment of the magnetic firearm support.
Figure 3:
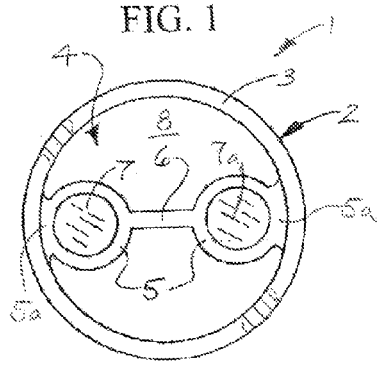
FIG. 3 is a bottom view of an illustrative embodiment of the magnetic firearm support.
Figure 4:
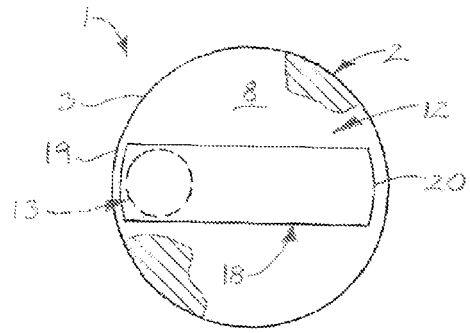
FIG. 4 is a top view of an illustrative embodiment of the magnetic firearm support.
Figure 5:
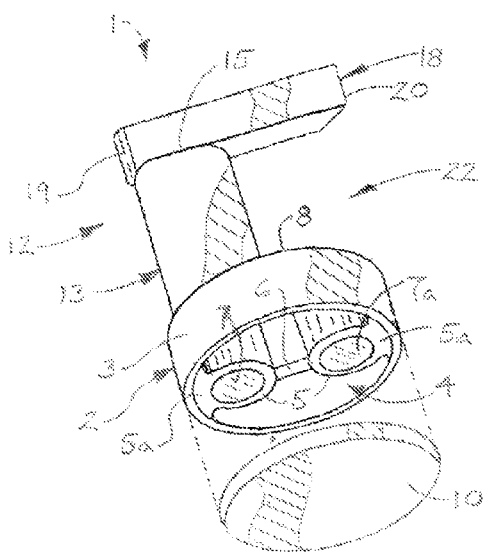
FIG. 5 is an exploded bottom perspective view of an illustrative embodiment of the magnetic firearm support.

Referring initially to FIGS. 1-5 of the drawings, an illustrative embodiment of the magnetic firearm support is generally indicated by reference numeral 1. Unless otherwise noted, the components of the magnetic firearm support 1 may be fabricated of ABS plastic and/or other suitable material using casting, molding and/or other fabrication techniques known by those skilled in the art. The magnetic firearm support 1 includes a magnetic base 2. In some embodiments, the base 2 may have a cylindrical base sidewall 3 which extends from a circular base panel 8. In other embodiments, the base 2 may have alternative shapes. As illustrated in FIGS. 3 and 5, the base 2 may have a base interior 4.

As illustrated in FIGS. 3 and 5, at least one magnet 7, 7a is provided in the base interior 4 of the base 2. In some embodiments, a bottom magnet 7 and a top magnet 7a may be provided in the base interior 4 in spaced-apart relationship to each other. The bottom magnet 7 and the top magnet 7a may each be an N52 Neodymium/Boron rare earth magnet which is known by those skilled in the art. In some embodiments, the bottom magnet 7 may have a pull force of about 54 lbs. and the top magnet 7a may have a pull force of about 28 lbs. and each magnet may be about ½" in diameter and about 1" in length. However, these pull force values and dimensions may vary in the various embodiments of the magnetic firearm support 1 depending on the particular size and application of the magnetic firearm support 1. Moreover, different types of magnets which are known by those skilled in the art and are suitable for the purpose of the magnetic firearm support 1 may be used.

The magnets 7, 7a may be mounted in the base interior 4 of the base 2 according to any suitable mounting technique which is known by those skilled in the art. In some embodiments, a pair of magnet holders 5 may be provided in the base interior 4. The magnet holders 5 may be attached to the base sidewall 3 via magnet holder attachments 5a. The magnets 7, 7a may be inserted in the respective magnet holders 5 and secured therein via a friction fit, glue, adhesive, mechanical fasteners and/or other suitable fastening technique known by those skilled in the art. A magnet holder connector 6 may connect the magnet holders 5 to each other.

In some embodiments, a slip-resistant base cover 10 may be provided on the base 2 to close the base interior 4. The base cover 10 may be vinyl or other material having a high coefficient of friction. The base cover 10 may be friction-fitted and/or otherwise secured in the base interior 4 according to the knowledge of those skilled in the art.

A firearm cradle 12 is supported by the base 2. The firearm cradle 12 may include a generally elongated firearm support member 13 having a proximal support member end 14 and a distal support member end 15. The proximal support member end 14 of the firearm support member 13 may be attached to the base panel 8 in offset relationship to the geometric center 2a of the base 2. Accordingly, as illustrated in FIG. 5, the longitudinal axis of the firearm support member 13 may be generally aligned with the bottom magnet 7 in the base 2. In other embodiments, the proximal support member end 14 may be attached to the base panel 8 at substantially the geometric center 2a of the base 2. In some embodiments, the proximal support member end 14 of the firearm support member 13 may be attached to the base panel 8 using mechanical fasteners and/or other suitable technique known by those skilled in the art. In other embodiments, the proximal support member end 14 of the firearm support member 13 may be cast, molded or otherwise fabricated in one piece with the base 2 according to the knowledge of those skilled in the art.

The firearm cradle 12 may further include a generally elongated firearm retaining member 18 which extends from the distal support end 15 of the firearm support member 13. The firearm retaining member 18 may include a proximal retainer end 19 generally at the distal support end 15 of the firearm support member 13 and a distal retainer end 20 opposite the proximal retainer end 19. A generally U-shaped firearm space 22 may be defined by and between the base panel 8 of the base 2 and the firearm support member 13 and the firearm retaining member 18 of the firearm cradle 12. As illustrated in FIG. 2, the longitudinal axis of the firearm support member 13 may be generally perpendicular to the plane of the base panel 8. The longitudinal axis of the firearm retaining member 18 may be generally perpendicular to the longitudinal axis of the firearm support member 13 and generally parallel to the plane of the base panel 8.

Figure 6:
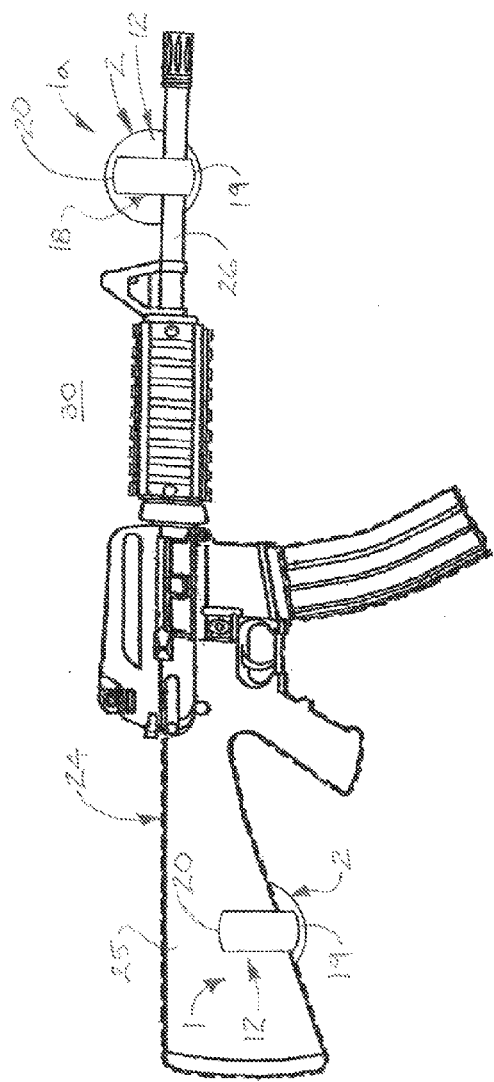
FIG. 6 is a side view of a firearm with a pair of magnetic firearm supports supporting the firearm on a steel surface in exemplary application of the supports.
Figure 7:
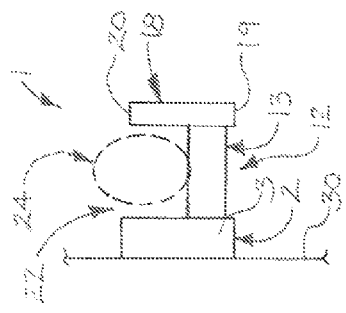
FIG. 7 is a side view of an illustrative embodiment of the magnetic firearm support attached to a steel surface and supporting a firearm (illustrated in phantom).

Referring next to FIGS. 6 and 7 of the drawings, in exemplary application, a pair of the magnetic firearm supports 1, 1a is used to support a firearm 24 such as a rifle or pistol on a steel surface 30 such as the interior surface of the door (not illustrated) of a firearm safe, for example and without limitation. The magnetic firearm supports 1, 1a are magnetically attached to the magnetic surface 30 in spaced-apart relationship to each other without modification of the magnetic surface 30. As illustrated in FIG. 7, the firearm support member 13 of the firearm cradle 12 is oriented horizontally whereas the firearm retaining member 18 is oriented vertically upwardly. Accordingly, the bottom magnet 7 (FIG. 5) may be positioned below the top magnet 7a in the base 2. As illustrated in FIG. 6, the selected spacing of the magnetic firearm supports 1, 1a relative to each other may be selected such that a rear magnetic firearm support 1 is positioned to support the stock 25 of the firearm 24 whereas a front magnetic firearm support 1a is positioned to support the barrel 26 of the firearm 24. Depending on the size, length and/or weight of the firearm 24, additional magnetic firearm supports 1 may be placed between the rear magnetic firearm support 1 and the front magnetic firearm support 1a according to the support requirements of the firearm 24. In some embodiments, the slip-resistant base cover 10 may increase the drag resistance of the base 2 on the magnetic surface 30 to prevent inadvertent slippage of the base 2 on the magnetic surface 30.

The firearm 24 is supported on the magnetic firearm supports 1, 1a by resting the stock 25 in the firearm space 22 (FIG. 7) of the firearm cradle 12 on the rear magnetic firearm support 1 and resting the barrel 26 in the firearm space 22 of the firearm cradle 12 on the front magnetic firearm support 1a. Therefore, the magnetic firearm supports 1 support the firearm 24 in a generally horizontal position on the magnetic surface 30 in such a manner that the firearm 24 can be easily accessed or retrieved for use.

It will be appreciated by those skilled in the art that the magnetic firearm supports 1, 1a can be easily detached from the magnetic surface 30 when use is not desired. Moreover, the magnetic firearm supports 1, 1a can be selectively placed in any desired positions on the magnetic surface 30 as deemed necessary to cradle the firearm 24. This expedient may facilitate customization of the magnetic firearm supports 1 according to the particular size, shape and weight of the firearm 24. While two of the magnetic firearm supports 1, 1a may be sufficient to support a pistol or other short firearm, three or more of the magnetic firearm supports 1 may be necessary to support a long firearm depending on the size, shape and weight of the firearm. The cradled position of the firearm 24 in the magnetic firearm supports 1, 1a renders the firearm 25 much more accessible than would be the case if the firearm 25 were to lie on a shelf inside a firearm safe. Because the magnetic firearm supports 1, 1a rely on gravity to maintain the firearm 25 in position in the respective firearm cradles 12, the firearm 25 is easier to remove from its storage position since the magnetism of the magnetic firearm supports 1, 1a need not be overcome as may be the case with respect to conventional firearm holding devices.

As illustrated in FIG. 7, it will further be appreciated by those skilled in the art that the firearm retaining member 18 acts as a mechanical stop for the firearm 24 as the firearm 24 rests in the firearm cradle 12 of the magnetic firearm support 1. In the event that the firearm safe door on which the firearm 24 is mounted is slammed shut, the firearm retaining member 18 prevents the firearm 24 from inadvertently falling from the firearm support member 13. This expedient permits placement of a larger number of firearms in the firearm safe by relocating firearms from the interior of the safe to the inside surface of the safe door, which is normally unusable space.

While various illustrative embodiments of the disclosure have been described above, it will be recognized and understood that various modifications can be made and the appended claims are intended to cover all such modifications which may fall within the spirit and scope of the disclosure.

What is claimed is:

1. A magnetic firearm support, comprising:
   a base having a base sidewall, a base panel carried by the base sidewall, a base interior defined by the base sidewall and the base panel, and a geometric center;
   a pair of magnet holder attachments extending from the base sidewall into the base interior;
   a pair of spaced apart ring-shaped magnet holders carried by the magnet holder attachments;
   a first and second magnet carried by the magnet holders respectively and located on opposite sides of the geometric center of the base;
   a firearm cradle having a firearm space carried by the base panel of the base, the firearm cradle having a firearm support member extending from the base and a firearm retaining member carried by the firearm support member; and
   said firearm support member having a longitudinal axis which is axially aligned with the first magnet.

2. The magnetic firearm support of claim 1 wherein the firearm cradle comprises a firearm support member carried by the base panel of the base and a firearm retaining member carried by the firearm support member.

3. The magnetic firearm support of claim 2 wherein the firearm support member is generally perpendicular to the base and the firearm retaining member is generally perpendicular to the firearm support member.

4. The magnetic firearm support of claim 2 wherein the firearm support member of the firearm cradle is offset with respect to a geometric center of the base.

5. The magnetic firearm support of claim 1 further comprising a slip-resistant base cover carried by the base.

6. The magnetic firearm support of claim 1 wherein the at least one magnet comprises a pair of spaced-apart magnets.

7. The magnetic firearm support of claim 1 wherein the base sidewall of the base is generally cylindrical.

8. A magnetic firearm support, comprising:
    a base having a base sidewall, a base panel carried by the sidewall and a base interior defined by the base sidewall and the base panel, the base having a geometric center;
    a pair of magnet holder attachments extending from the base sidewall into the base interior on opposite sides of the geometric center of the base;
    a pair of spaced-apart ring-shaped magnet holders carried by the magnet holder attachments, respectively;
    a magnet holder connector connecting the magnet holders;
    a first magnet and a second magnet carried by the magnet holders, respectively; and
    a firearm cradle including:
        a generally elongated firearm support member having a proximal support end carried by the base panel of the base and a distal support end opposite the proximal support end, the firearm support member having a longitudinal axis generally aligned with the first magnet in the base;
        a generally elongated firearm retaining member having a proximal retainer end carried by the distal support end of the firearm support member and a distal retainer end spaced-apart from the proximal retainer end; and
        a firearm space defined by and between the base panel of the base and the firearm support member and the firearm retaining member of the firearm cradle.

9. The magnetic firearm support of claim 8 wherein the firearm support member is generally perpendicular to the base panel of the base and the firearm retaining member is generally perpendicular to the firearm support member.

10. The magnetic firearm support of claim 8 further comprising a slip-resistant base cover carried by the base.

* * * * *